UNITED STATES PATENT OFFICE.

IGNAZ KREIDL, OF VIENNA, AUSTRIA-HUNGARY.

CLOUDENING AGENT FOR PRODUCING CLOUDENING EFFECTS IN WHITE ENAMELS AND PROCESS OF PRODUCING THE SAME.

1,101,455.   Specification of Letters Patent.   Patented June 23, 1914.

No Drawing.   Application filed March 28, 1912.   Serial No. 686,888.

*To all whom it may concern:*

Be it known that I, Dr. IGNAZ KREIDL, a subject of the Emperor of Austria-Hungary, residing at XXI. Sebastian-Kohlgasse 5-9, Vienna, in the Empire of Austria-Hungary, have invented a new and useful Cloudening Agent for Producing Cloudening Effects in White Enamels and Process of Producing the Same, of which the following is a specification.

This invention relates to cloudening agents for white enamel and to processes for producing said cloudening agents. Hitherto the oxids of tin, titanium, and the oxids and silica containing compounds of zirconium, aluminium and the like have been most commonly used for rendering enamel, and similar vitreous masses opaque.

The object of the present invention is to employ the compounds of the metals suitable for opaquing purposes in a condition which it has been found renders them of increased value for the purpose, viz., in chemical combination with water.

The cloudening agent of the present invention consists of a hydrated compound of a suitable metal, such as for example, tin, titanium, zirconium, aluminum or the like, such compound containing a small quantity of alkali.

A suitable process for preparing a hydated zirconium oxid containing alkali consists in partially removing the combined alkali from an alkaline zirconate produced for example by completely separating out the silicic acid from zircon by heating with an alkaline flux or by heating zirconium oxid with an alkaline flux by means of water and a solution of weak acid or salt of a weak base, and subsequently drying the hydrated residue at such a temperature that only part or none of the combined water is driven off. These compounds, if prepared from natural silicates may contain silica. In this manner zirconium hydrates containing different quantities of water are obtained, this depending on the temperature of drying, and in some cases with different quantities of alkali.

A suitable process for preparing hydrated silica containing zirconium compounds containing alkali, consists in partially separating out the silica acid from zircon by heating with an alkaline flux, such as carbonates or hydrates of the alkalis or alkaline earths, but preferably of sodium, in the manner already described. By similar means other hydrated metal compounds suitable for the purpose can be prepared. For instance tin hydroxids may be obtained from an alkaline stannate by partially removing the combined alkali and subsequently drying the hydrated residue.

Compounds having the constitution set out above are added to the enamel mass. The enamel mass is melted without addition of the cloudening agent, and the cloudening agent is mixed with the ready melted and ground enamel mass. Such compounds produce a cloudening or opaquing effect and have increased "covering" power. The enamel mass will be employed in the usual way.

What is claimed is:—

1. An opaquing agent for white enamel comprising an alkali-containing hydrated compound of a metal having opaquing properties.

2. An opaquing agent for white enamel comprising hydrated alkali-containing compound of zirconium.

3. An opaquing agent for white enamel comprising a hydrated silica-containing compound of a metal having opaquing properties, such compound containing a small quantity of alkali.

4. An opaquing agent for white enamel comprising a hydrated silica-containing compound of zirconium, such compound containing a small quantity of alkali.

5. An opaquing agent for white enamel comprising an alkali containing hydrated compound of a metal having opaquing properties from which the alkali has been partially but not entirely removed.

6. An opaquing agent for white enamel comprising an alkali containing hydrate of zirconium, from which the alkali has been partially but not entirely removed.

7. An opaquing agent for white enamel comprising an alkali containing hydrated compound of a metal having opaquing properties, also containing silica.

8. A process of manufacturing white opaquing agents for enamel comprising partially removing combined alkali from an alkali-containing hydrated compound of a metal having opaquing properties by means of a suitable solvent.

9. A process of manufacturing white opaquing agents for enamel comprising partially removing combined alkali from zirconates, by means of a suitable solvent.

10. A process of manufacturing white opaquing agents from natural silicates of a metal the compounds of which have opaquing properties comprising separating out silicate acid from the silicates by means of an alkaline agent and partially removing the thus combined alkali.

11. A process of manufacturing white opaquing agents comprising separating out silicic acid from zircon by means of an alkaline opening agent and partially removing the thus combined alkali.

12. A process of manufacturing white opaquing agents comprising separating out silicic acid from zircon by means of an alkaline opening agent and partially removing the thus combined alkali by means of a suitable solvent.

13. A process of manufacturing white opaquing agents comprising heating zirconium oxid with an alkaline flux and partially removing the thus combined alkali.

14. A process of manufacturing white opaquing agents comprising separating out silicic acid from the natural silicates of a metal the compounds of which have opaquing properties, by means of an alkaline agent, washing out the formed silicates and subsequently partially removing the thus combined alkali.

In testimony whereof I have signed my name to this specification in the presence of two subscribing witnesses.

Dr. IGNAZ KREIDL.

Witnesses:
 Hugo Reik,
 August Fugger.